United States Patent Office 3,819,599
Patented June 25, 1974

3,819,599
CATALYST AND PROCESS FOR THE POLYMERIZATION OF ETHYLENE AND TERMINAL OLEFINS
Peter Fotis, Highland, Ind., and David E. Boone, Downers Grove, Ill., assignors to Standard Oil Company, Chicago, Ill.
No Drawing. Filed May 31, 1972, Ser. No. 258,319
Int. Cl. C08f 1/56, 3/06
U.S. Cl. 260—94.9 DA
15 Claims

ABSTRACT OF THE DISCLOSURE

An improved method of preparing a supported catalyst and process for the use thereof for polymerization of ethylene, terminal olefins or a mixture thereof that gives high polymer yields and improved molecular weight control when used in conjunction with chain terminating agents which comprises contacting said olefin or said mixture with (a) a Group IV–B or Group V–B transition metal compound in combination with a support material which is the reaction product of an aluminum halide and a Group II–A, II–B or VII–B hydroxyhalide, alkoxide, hydroxide-alkoxide, hydrous oxide, hydrated oxide or hydroxide and (b) an organoaluminum compound.

SUMMARY OF THE INVENTION

This invention relates to an improved method of preparing a supported catalyst and a process for the use thereof for the polymerization of ethylene, terminal olefins or a mixture thereof. More specifically, the invention relates to an improved method of preparing a supported catalyst and process for the use thereof for the polymerization of ethylene, alpha-olefins or a mixture thereof wherein the molecular weight of the final polymeric product is more easily controllable and large yields of polymer are obtained which can obviate the necessity of separating the catalyst from the polymeric products as formed.

In accordance with the instant invention, ethylene, alpha-olefins or a mixture thereof is polymerized to a normally solid polymer at medium pressures and moderate temperatures by contacting said olefin or said mixture of olefins with a supported catalyst system comprising (a) a Group IV–B or Group V–B transition metal halide, ester or haloester in combination with a support material which is the reaction product of an aluminum halide and a Group II–A, II–B or VII–B hydroxyhalide, alkoxide, hydroxide-alkoxide, hydrated oxide, hydrous oxide or hydroxide and (b) an organoaluminum compound. Polyethylene produced using the instant catalyst system can be formed in yields over 10,000 grams of polymer per gram of solid catalyst for an hour at about 400 p.s.i.g. and above and has an easily controlled molecular weight distribution when hydrogen is used as a chain terminating agent. Thus, a wide range of polymer products can be produced which are useful for a number of different applications for which polyethylenes, poly alpha-olefins and copolymers thereof have shown their suitability in the past.

BACKGROUND OF THE INVENTION

British Pat. 1,208,242 and British Pat. 1,255,575 describe in part a support material wherein aluminum chloride and magnesium hydroxide are combined together and the product thereof subsequently combined with a halide of titanium. This material when combined with an organometallic compound is useful for the polymerization of ethylene. The yields of polymer obtained, however, are moderate and range from about 400 to about 500 grams of polymer per gram of catalyst per hour at about 140 p.s.i.g. of ethylene pressure and, in addition, the catalyst is formed through an involved process at elevated temperatures.

Now it has been found that by making certain novel modifications in the preparation and use of a related catalyst system, polymer yields in excess of 10,000 grams per gram of solid catalyst for an hour at pressures of 400 p.s.i.g. and above can be obtained and, in addition, the process of catalyst preparation is simplified. A hydrogen sensitive polymerization process which is thus simplified and has such a high rate is of distinct economic advantage since, inter alia, polymeric products may be produced which require no separation from the catalysts used prior to polymer use.

STATEMENT OF THE INVENTION

The novel support material of the instant invention is made by the reaction of a first component which is a Group II–A, II–B or VII–B hydroxy-halide, alkoxide, hydroxide-alkoxide, hydrated oxide, hydrous oxide or hydroxide, more preferably, a Group II–A hydroxide, hydroxide-alkoxide or hydroxyhalide and, most preferably, magnesium hydroxide or magnesium hydroxide-alkoxide with a second component. By hydroxide-alkoxide is meant a hydroxide which contains some alkoxide functionality wherein said alkoxide function is composed of oxygen and a hydrocarbon moiety of one to about six carbon atoms.

The second component is usefully any aluminum halide and, more preferably, the second component is aluminum chloride or aluminum bromide. Most preferably, the second component is aluminum chloride.

In one embodiment of the instant invention a high surface area form of the first component is used. The surface area of the first component in this modification is preferably about 50 to about 400 square meters per gram and, most preferably, about 100 to about 300 square meters per gram. For example, a Group II–A hydroxide or hydroxide-alkoxide prepared by slowly adding a solution of the Group II–A alkoxide to water while stirring produces a material suitable for this embodiment, cf., Bull. Soc. Chim. (1970) at page 3384.

The relative amounts of the first and second components of the support material which are reacted together can usefully vary from about 50 moles of the first component and about 1.0 moles of the second component to about 1.0 moles of the first component and about 5.0 moles of the second component. More preferably, the first and second components are reacted in amounts of about 10 moles of the first component and about 1.0 moles of the second component to about 1.0 moles of the first component and about 2.0 moles of the second component. Most preferably, the ratio of the first and second components reacted varies from about 4.0 moles of the first component and about 1.0 mole of the second component to about 1.0 moles of the first component and about 1.5 moles of the second component.

Purity of the first and second components appears to be important as it has been found that a support material made from starting material of Technical Grade purity produces a supported catalyst which shows an activity substantially less than that obtained when higher purity reactants are used.

Usefully, the first and second components above are reacted in the appropriate mole ratio at a temperature between about 25° C. and about 200° C. More preferably, the reaction temperature is chosen between about 60° C. and about 150° C. Most preferably, a reaction temperature between about 60° C. and about 120° C. is used.

However, one embodiment contained herein allows an essentially room temperature preparation. Here the first and second components above are reacted in the appropriate mole ratio at a temperature between about 10° C. and about 50° C. More preferably, the reaction temperature is chosen between about 15° C. and about 35° C. Most preferably, a reaction temperature between about 20° C. and about 30° C. is used.

Reaction in either temperature range is accomplished in the presence of a substantially non-reactive fluid medium and some care must be selected in choosing the particular medium used. To obtain the lower temperature range embodiment care must be taken to at least partially solubilize the aluminum halide in the lower reaction temperature range used. In the lower temperature embodiment in which the first component is in a high-surface-area form, an ether, alone or in combination with a hydrocarbon, preferably aliphatic, is used. In the lower temperature embodiment wherein the first component is not in a high-surface-area form, a solubilizing preparative medium such as a halogenated aliphatic hydrocarbon, or a halogenated aliphatic hydrocarbon or ether in combination with an aromatic hydrocarbon is preferably used. Preferably, where an ether is being employed, a di-lower alkyl ether, wherein lower alkyl refers to a hydrocarbon group of from one to about six carbon atoms, is used.

In the higher temperature range embodiment, an aliphatic or aromatic hydrocarbon is the preparative medium used. Preferably, an aromatic hydrocarbon such as benezene is used to prevent agglomerization of the support material.

It is important, for best results that the preparation medium and any wash solvent be free of traces of moisture, oxygen, carbon dioxide and polar organic compounds, so prior to use, it should be percolated through, for example, silica gel or molecular sieves for best results.

The reaction to form the support material is usefully carried out over about thirty minutes to about forty-eight hours, more preferably, about one hour to about thirty-six hours, and, most preferably, about three hours to about twenty-four hours. This normally produces the reaction product as a finely divided slurry which is used directly to combine with the Group IV–B or Group V–B compound.

The support material as made above is combined with a Group IV–B or V–B halide, ester or haloester to form a supported Group IV–B or Group V–B compound composition which is the supported catalyst. This combining is effected by admixing the Group IV–B or Group V–B compound and the support material in the fluid preparation medium.

If the higher temperature embodiment is used, the combining step is carried out within the same temperature range as was specified above for preparing the support material. If one of the lower temperature embodiments is used, the combining step is carried out at about 10° C. to about 50° C., preferably about 20° C. to about 30° C. Combining times are usefully one to about thirty-six hours. More preferably, a combining time of about two to about twenty-four hours is used for any one of the embodiments.

Usefully, any oxyhalide, halide, ester or haloester of a Group IV–B or Group V–B element may be used. More preferably, a higher-valent titanium or vanadium alkoxide, chloroalkoxide, bromoalkoxide, chloride or bromide can be used. Most preferably, the compound used is titanium tetrachloride or vanadium tetrachloride.

In general, the amount of the Group IV–B or Group V–B compound used for the combining with the support material is not important as long as enough is used to insure that the supported catalyst contains at least about 0.1 percent by weight of the Group IV–B or Group V–B compound calculated as the metal. For combining, a weight ratio of Group IV–B or Group V–B compound to support material of from about 1:300 to about 1:2 is useful. More preferably, a weight ratio of about 1:100 to about 1:3 is used and, most preferably a weight ratio of about 1:40 to about 1:10 is used. If one of the lower temperature embodiments is used, a generally lower ratio may be used and the supported catalyst will still be effective for polymerization.

Any loosely adhering Group IV–B or Group V–B compound may be removed from the supported catalyst by washing it at about room temperature or somewhat above with a solvent which at least partly dissolves the Group IV–B or Group V–B compound. For example, such materials as aromatic or aliphatic hydrocarbons, preferably aliphatic hydrocarbons, have been used successfully to wash the supported catalyst.

The chemical form of the Group IV–B or Group V–B compound on the support material is unknown, but since it appears impossible to remove it completely with solvent, it is either chemically linked to the support material or strongly physically adsorbed on the support material. Since the chemical form of the Group IV–B or Group V–B compound on the surface of the support is unknown it may or may not exhibit, depending upon the Group IV–B or Group V–B compound used, halide and/or alkoxy linkages.

The amount of Group IV–B or Group V–B compound placed on the support material after the above combining is relatively small being in the range of about 0.1 to about 10 percent of the support weight calculated as the Group VI–B or Group V–B metal. More preferably, it is about 0.5 to about 5 weight percent, and, most preferably, it is about 1 to about 3 weight percent. Other things being equal, the more Group IV–B or V–B compound combined with the support material, the more active in terms of yield the supported catalyst becomes.

It has been found preferable to replace the preparation solvent with an alkane, preferably, hexane, after preparation and prior to use of the supported catalyst for polymerization. The supported catalyst is then added to the polymerization vessel as a slurry in the alkane.

Use of the above supported catalyst for the polymerization of olefins is accompanied, for best results, by the use of an organoaluminum compound such as a trialkyl, a dialkylhalide, a dialkyl hydride or a combination thereof. More preferably, a trialkylaluminum or dialkylaluminum hydride is used. Most preferably, a trialkylaluminum is the compound which is used. By alkyl here is meant a hydrocarbon group containing one to about six carbon atoms. For best results with average grade solvents, part of the total material added is used to pretreat the solvent. The remaining material is then added as a concentrated mixture of alkyl and supported catalyst.

It has been found to be important in achieving the high yields of the instant invention to pretreat the supported catalyst with at least one-quarter, and more preferably at least one-half, of the total amount of organoaluminum compound used by bringing them together for a short period of time, e.g., several minutes, in a concentrated form, e.g., a syringe, just prior to use in polymerization. It is unknown why this prepolymerization contacting of the supported catalyst and the organoaluminum compound substantially increases the yield, but it does so by a factor of about 5 or more.

For useful results, the ratio of total millimoles of organoaluminum used to grams of supported catalyst should be at least about 2:1. More preferably, it is at least about 10:1 and, most preferably, it is at least about 25:1. This ratio depends upon polymerization temperature somewhat, increasing as polymerization temperature decreases. More markedly, it depends upon the purity and the amount of polymerization solvent used and impure solvents can markedly change the amount required for optimum results. It should be understood that a different organoaluminum compound can be added with the catalyst than that which is added to the solvent.

The promoted and supported catalyst described above may be used in the particle form or the solution form variations in the temperature range from about 0° C. to over 270° C. These promoted and supported catalysts may be used also in a solventless process wherein the olefin is the liquid phase or wherein the olefin is polymerized directly from the vapor phase. The polymerization temperature using a solventless process should be large enough to give an adequate polymerization rate but not too large to raise the pressure above that which is normally used in this type of process, i.e., about several hundred p.s.i.g.

In the particle form or slurry process, the polymerization is carried out at a temperature such that the polymer as formed is a solid in the polymerization reactor. The preferred polymerization temperature is about 40° C. to about 108°. In the solution form the temperature of polymerization preferably varies from about 120° C. to about 270° C. In either the vapor or bulk process wherein only the supported catalyst and promoter are present along with monomer, the useful temperature range is from about 0° C. to about 130° C., preferably, about 20° C. to about 120° C.

Usefully, the pressure range for the polymerization process is about atmospheric to over 1000 p.s.i.g. More preferably, the polymerization pressure varies upwards from about 200 p.s.i.g. and, most preferably, the polymerization range as applied here is about 300 p.s.i.g. or larger. The polymerization yield depends upon the olefin pressure and substantial increases in yields have been noticed by raising the pressure from about 100 p.s.i.g. to about 300 to about 400 p.s.i.g.

The novel support of this invention when employed for the polymerization of olefins is used normally with an additive to control molecular weight such as hydrogen. Solid polymers having molecular weights greater than about 50,000 and less than about 3,000,000 result thereby. The amount of hydrogen to be used depends upon the molecular weight distribution to be obtained and is well known to those skilled in the art.

Whereas the preferred olefin to be polymerized is ethylene, it is found that the support material when combined with a Group IV-B or Group V-B compound and used with a promoter is useful for the polymerization of $C_3$ to $C_8$ alpha-olefins such as propylene, butene, pentene, dienes such as butadiene, and mixtures thereof of up to about 10 weight percent, preferably up to about 5 weight percent, of a second olefin, e.g., ethylene with 1-butene, ethylene with propylene etc.

It is of importance for best results, that the olefin, for example, ethylene, be substantially free of catalyst poisons. Thus, it is preferred to use polymerization grade olefin and to pass it, for example, through a molecular sieve prior to use to remove the remaining traces of moisture, oxygen, carbon dioxide and polar organic compounds.

The organic liquid employed as the polymerization solvent in the solution process or particle form process can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene or xylene or a halogenated aromatic compound such as chlorobenzene, chloronaphthalene or orthodichlorobenzene. The nature of the solvent is subject to considerable variation, although the solvent employed should be liquid under the conditions of reaction and relatively inert. Hydrocarbon liquids, preferably, hexane are desirably employed. Other solvents which can be used include ethylbenzene, isopropylbenzene, ethyltoluene, n-propylbenzene, diethylbenzenes, mono- and dialkylnaphthalenes, n-pentane, n-octane, isooctane or methylcyclohexane.

The solvents employed in practicing this invention should be purified, for best results, from traces of moisture, oxygen, carbon dioxide and polar organic compounds prior to use in the polymerization reaction by contacting the solvent, for example, in a distillation procedure or otherwise, with an organoaluminum compound, for example, triethylaluminum or diisobutylaluminum hydride, prior to or after percolating the solvent through, for example, silica gel or molecular sieves.

The polymerization time is not critical and will usually be of the order of thirty minutes to several hours in batch processes. Contact times of from one to four hours are commonly employed in autoclave-type reactions. When a continuous process is employed, the contact time in the polymerization zone can also be regulated as desired, and in some cases it is not necessary to employ reaction or contact times much beyond one-half to one hour since a cyclic system can be employed by precipitation of the polymer and return of the solvent and excess monomer to the charging zone wherein the catalyst can be replenished and additional monomer introduced.

The polyolefins prepared in accordance with this invention can be extruded, mechanically melted, cast or molded as desired. They can be used to form plates, sheets, films or a variety of molded objects.

While the invention is described in connection with the specific Examples below, it is to be understood that these are for illustrative purposes only. Many alternatives, modifications and variations will be apparent to those skilled in the art in the light of the below Examples and such alternatives, modifications and variations fall within the scope and spirit of the appended claims.

GENERAL PROCEDURE

In the following Examples, reagent grade chemicals and dried solvents were used throughout. Melt indices were measured using ASTM D 1238.

EXAMPLE I

A 12.5 gram portion of reagent grade magnesium hydroxide was mixed with a 19.2 gram portion of reagent grade aluminum chloride at room temperature. The mixture was then heated with no stirring under positive purified nitrogen pressure at 100° C. for 24 hours. The solid was then ball-milled under a purified nitrogen atmosphere for about 24 hours to a fine powder.

A 2.0 gram portion of the $Mg(OH)_2$—$AlCl_3$ reaction product was combined with 2 milliliters of reagent grade titanium tetrachloride in 30 milliliters of purified xylene at 102° C. for four hours. The resulting solid was washed with purified hexane and additional purified hexane added to give a catalyst slurry.

Into a dried, 500 milliliter stirred reactor was charged

EXAMPLE II 160 milliliters of purified hexane and purified ethylene added to a pressure of 50 p.s.i.g. With the hexane at 160° F. the system was vented to atmospheric pressure and 7 milligrams of catalyst of Example I as a slurry was charged followed immediately by the addition of 18 milligrams of triethylaluminum as a solution in alkane. The reactor was closed and the system was pressured while stirring to 600 p.s.i.g. with purified ethylene containing 23.7 mole percent of purified hydrogen. After two minutes the feed gas was switched to 100 percent ethylene fed on demand at 600 p.s.i.g. The reaction temperature rose from 150° F. to 190° F. within four minutes.

After eight minutes the reaction temperature was at 185° F. where it was kept during the rest of the polymerization. The reaction was stopped after one hour by venting and rapid cooling. A 40 gram amount of polyethylene was obtained which corresponds to a yield of 5700 grams polymer per gram of catalyst. The melt index product was 2.7 grams per 10 minutes (ASTM D 1238). The inherent viscosity at 0.1 gram per 100 milliliters of Decalin at 145° C. was 1.3 and the densities were 0.965 for the unannealed product and 0.979 for the annealed product.

EXAMPLE III

Into a dried, evacuated, 500 milliliter, stainless steel, stirred reactor at 330° F. was charged 190 milliliters of purified hexane and 150 p.s.i.g. purified hydrogen. The system was then pressured to 500 p.s.i.g. with purified ethylene and the temperature equilibrated at 180° F.

A 5 milligram portion of the catalyst of Example I slurried in one milliliter of purified hexane was placed in a catalyst addition assembly. This was washed into the reactor with 17 milliliters of purified hexane containing 17 milligrams of triethylaluminum under 600 p.s.i.g. of purified ethylene pressure. The reaction pressure was maintained at 600 p.s.i.g. with ethylene fed on demand. The reaction temperature rose to 199° F. for about 5 minutes immediately following catalyst addition. The temperature was lowered to 180° F. and maintained there during the remainder of the reaction.

After one hour the polymerization was stopped by venting and cooling. A 59 gram amount of polyethylene was obtained corresponding to a yield of 11,800 grams polymer per gram of catalyst. The melt index of the product was 2.0 grams per 10 minutes (ASTM D 1238).

EXAMPLE IV

Into a dried, evacuated, 500 milliliter, stainless steel, stirred reactor at 330° F. was charged 190 milliliters of purified hexane and 75 p.s.i.g. of purified hydrogen. The system was then pressured to 500 p.s.i.g. with purified ethylene and the hexane mixture equilibrated at 180° F. Into a catalyst addition assembly was placed 1.5 milligrams of the catalyst of Example I slurried in hexane which had been premixed with 26 milligrams of triethylaluminum in 3.2 milliliters of purified hexane for about one minute. This mixture was washed into the reactor with 17 milliliters of purified hexane pressured by 600 p.s.i.g. of purified ethylene. The reaction temperature immediately rose to 185° F. and was stabilized at 180° F. within four minutes and maintained at 180° F. during the reaction. The reaction was stopped after one hour by venting and rapid cooling. A 40.0 gram amount of polyethylene was obtained corresponding to a yield of 26,000 grams polymer per gram of catalyst. The melt index of the product was 0.2 grams per 10 minutes (ASTM D 1238).

EXAMPLE V

Into a 100 milliliter round bottom flask equipped with a Teflon covered stirrer, an inlet tube for argon and an outlet tube was added 0.3 grams of magnesium hydroxide aerogel prepared using the method in Bull. Soc. Chim. 1970, page 3384, 0.46 grams of $AlCl_3$ dissolved in 1 milliliter of diethyl ether and 40 milliliters of hexane. The suspension was magnetically stirred for 3 hours after which 0.017 grams of $TiCl_4$ dissolved in 1 milliliter of xylene was added. The stirring was continued for 16 hours. The solid remains in a finely divided state. The hexane was decanted and the solid was suspended in additional hexane to make a dilute slurry to use for polymerization.

EXAMPLE VI

The procedure used was the same as Example X except commercial powdered $Mg(OH)_2$ of normal surface area was used. Upon the addition of the $AlCl_3$ in ether the solid became a thick mud difficult to stir and after the addition of $TiCl_4$ the mud became a hard friable solid. The hexane was decanted and the solid was broken up; finally, additional hexane was added to make a dilute slurry for polymerization.

EXAMPLE VII

The polymerization procedure for Examples V and VI was as follows: To a 500 milliliter rocking vessel evacuated to 1 torr. at 190° F. was added 100 p.s.i.g. of hydrogen. One hundred milliliters of purified hexane solvent was added followed by a concentrated mixture of catalyst (slurry in hexane containing 3 milligrams of solid catalyst) and 132 milligrams of triethyl aluminum in a small amount of hexane. Ethylene was pressured in to give a total pressure of 700 p.s.i.g. and fed on demand as the polymerization proceeded. Polymerization was terminated after 1 hour and the reaction mixture was cooled, excess, olefin vented and the polymer produced was decanted, dried and weighed.

| Catalyst | Yield (grams polymer/ gram of solid catalyst) | Melt index (grams/10 min.) |
|---|---|---|
| Example: | | |
| V | 15,600 | 0.91 |
| V[1] | [1] 15,950 | [1] 0.33 |
| V[2] | [2] 650 | |
| VI | 16,300 | 1.6 |

[1] A 47-milligram amount of $Et_3Al$ in alkane was used. Average of two runs.
[2] A 24-milligram amount of $Et_3Al$ was used. Average of two runs.

EXAMPLE VIII

To a 100 milliliter round bottom flask equipped with stirring, an inlet tube to maintain a gentle argon purge and an outlet tube was added 0.3 grams of magnesium hydroxide, 30 milliliters of purified hexane and 0.7 milliliter solution of $AlCl_3$ in ethyl ether (conc. 0.58 grams of $AlCl_3$ in 1 milliliter of solution). The suspension was stirred at room temperature for 3 hours. Twenty milliliters of the clear liquid was decanted and replaced with 30 milliliters of fresh purified hexane. To the suspension was added 1 milliliter of a xylene solution of $TiCl_4$ (conc. 0.17 grams of $TiCl_4$ per 10 milliliters of xylene). The reaction was continued with stirring at temperature for 18 hours. Twenty five milliliters of hexane were decanted and replaced with 40 milliliters of fresh purified hexane. To check the catalyst 10 milliliters of this suspension was diluted with 40 milliliters of purified hexane. The concentration of this catalyst slurry was 1.5 milligrams per milliliter.

EXAMPLE IX

To the reaction apparatus in Example VIII was added 30 milliliters of hexane, 0.3 grams of magnesium hydroxide and 0.46 grams of $AlCl_3$ powder. The suspension was stirred at room temperature for three hours. To the suspension was added a one milliliter xylene solution of $TiCl_4$ (conc. 0.17 grams $TiCl_4$ per 10 milliliters of xylene). The reaction was continued with stirring for 16 hours. Twenty-five milliliters of hexane were decanted and replaced with 40 milliliters of fresh purified hexane. To check the catalyst 10 milliliters of this suspension was diluted with 40 milliliters dry hexane. The concentration of this catalyst slurry was 1.5 milligrams per milliliter.

EXAMPLE X

The procedure of Example IX was used except that magnesium hydroxide aerogel was used.

EXAMPLE XI

The polymerization conditions were the same as in Example VII except a 47 milligram amount of $Et_3Al$ in alkane was used.

| Catalyst | Yield (grams polymer/ gram of solid catalyst) | Melt index (grams/10 min.) |
|---|---|---|
| Example: | | |
| VIII | 14,600 | 0.25 |
| IX | 1,660 | 0.2 |
| X | 3,000 | 0.12 |

EXAMPLE XII

Into a 500 milliliter flask under argon at room temperature was stirred for three hours 14.5 grams $Mg(OH)_2$ and 22.8 grams of $AlCl_3$ suspended in 150 milliliters of benzene and 5 milliliters of ethyl ether. To the suspension was added 0.4 grams of TiCl₄ and stirring was continued for an additional 16 hours. The suspension remains in a finely divided state through both reactions. After settling, 130 milliliters of the benzene-ether mixture was drawn off and the solid was washed with three 100 milliliter aliquots of hexane. A dilute slurry (4.57 milligrams per milliliter) was made.

EXAMPLE XIII

A supported catalyst was prepared using the procedure of Example XII except that 10 milliliters of tetrahydrofuran was used instead of 5 milliliters of ethyl ether and 150 milliliters of hexane was used instead of the benzene.

EXAMPLE XIV

A supported catalyst was prepared using the procedure of Example XII except that 15 milliliters of chloroform replaced the 5 milliliters of ethyl ether and 150 milliliters of hexane replaced the benzene.

EXAMPLE XV

Into a 100 milliliter, 1-necked flask was placed 20 milliliters of purified hexane and 1.01 grams of magnesium hydroxide. To this magnetically stirred mixture was added 17.8 milliliters of nitrobenzene containing 1.53 grams of aluminum chloride. After addition of one milliliter of the $AlCl_3$-nitrobenzene solution, the solid agglomerated but did not stick to the stirrer or to the flask. The reaction mixture was stirred at room temperature for three hours. During this time the solid became more powder-like.

Two milliliters of a hexane solution containing 12.4 milligrams of titanium tetrachloride per milliliter was added to give one weight percent $TiCl_4$ based on the weight of $Mg(OH)_2$ and $AlCl_3$ used. This mixture was stirred overnight at room temperature to give catalyst slurry a.

To some of the slurry a, two milliliters of titanium tetrachloride was added. This mixture was stirred at room temperature for four days. Part of this mixture was washed six times with 50 milliliter aliquots of purified hexane in an unsuccessful attempt to remove unsupported titanium tetrachloride. Finally 100 milliliters of dried hexane was added to give catalyst slurry b used in the polymerizations below.

EXAMPLE XVI

The polymerization procedure of Example VII was used.

| Catalyst | Yield (grams polymer/ gram of solid catalyst) | Et₃Al used (milli- grams) | Melt index (grams/10 min.) |
|---|---|---|---|
| Example: | | | |
| XII | 10,400 | 47 | 0.27 |
| XII | 15,300 | 132 | 0.15 |
| XIII | 9,300 | 47 | 0.67 |
| XIII | 8,300 | 132 | 0.56 |
| XIV | 9,000 | 132 | 0.21 |
| XVb(1)* | 6,300 | 44 | 0.06 |
| XVb(2)* | 2,000 | 44 | 1.2 |

*Polymerization procedure was to heat a 500 milliliter, stainless steel reactor at 118° C. overnight under a nitrogen flow and then to evacuate to 1 torr and break the vacuum with 150 p.s.i.g. of ethylene and 244 milliliters of purified hexane containing 22 milligrams of Et₃Al. When the contents had equilibrated at 82° C., 155 [b(1)], 305 [b(2)] p.s.i.g. of hydrogen was charged and the system pressured to 600 p.s.i.g. total pressure with ethylene. Then 3 milligrams [b(1)], 6 milligrams [b(2)] if solid catalyst, premixed with the Et₃Al in a syringe giving a total volume of 2.7 milliliters, was made, placed into the catalyst addition assembly and pressured in using ethylene.

EXAMPLE XVII

Into a 500 milliliter, 1-necked flask was mixed 23.5 grams of $AlCl_3$, 15.4 grams of $Mg(OH)_2$ powder, and 200 milliliters of benzene. This mixture was stirred magnetically and heated at reflux under a nitrogen atmosphere for 17 hours. The solid did not agglomerate but remained as a slurry. Then 0.25 milliliters of TiCl₄ was added corresponding to about 1 weight percent based upon starting solids. This mixture was heated at reflux for four hours. An aliquot of this reaction mixture was removed, washed with 100 milliliters of hexane to give catalyst slurry XVIIa. To the remaining refluxing reaction mixture, an additional 2.0 milliliters of TiCl₄ was added, corresponding to about 10 weight percent TiCl₄ based on starting solids. This reaction mixture was heated at reflux for 18 hours. An aliquot of this reaction mixture was removed and washed with 100 milliliters of hexane to give catalyst slurry XVIIb. To the remaining refluxing reaction mixture, an additional 4.0 milliliters of TiCl₄ was added corresponding to about 30 weight percent of TiCl₄ based on starting solids. This mixture was refluxed for 24 hours. An aliquot of this reaction mixture was removed and washed with 150 milliliters of hexane to give catalyst slurry XVIIc.

EXAMPLE XVIII

Into a 500 milliliter, 1-necked flask was mixed 24.2 grams of $AlCl_3$, 15.4 grams of $Mg(OH)_2$ powder, and 200 milliliters of benzene. This mixture was stirred magnetically at room temperature under a nitrogen atmosphere for 18 hours. The solid did not agglomerate but remained an easily stirred slurry. Hydrogen chloride was evolved. Then 0.23 milliliters of TiCl₄ was added corresponding to about 1 weight percent TiCl₄ based on solids added. This reaction mixture was stirred for six hours and then 2.1 milliliters of TiCl₄ was added to give a total of 10 weight percent TiCl₄ based on solids added. This reaction mixture was stirred at room temperature for 18 hours. An aliquot of this slurry was washed with 150 milliliters of hexane to give catalyst slurry XVIII.

EXAMPLE XIX

Into a 500 milliliter flask was mixed 23.4 grams of $AlCl_3$, 35.1 grams of $Mg(OH)_2$ powder, and 200 milliliters of benzene. This mixture was stirred magnetically and heated at reflux under a nitrogen atmosphere for 24 hours. The solid did not agglomerate but remained as a slurry. Hydrogen chloride was evolved. Then 3.3 milliliters of TiCl₄ was added corresponding to about 10 weight percent based on starting solids. This was heated at reflux for 24 hours. The reaction mixture was cooled to room temperature and the solid was washed with purified hexane to give catalyst slurry XIX.

EXAMPLE XX

The following particle form polymerizations were carried out in a 500 milliliter stirred autoclave using 261 milliliters of hexane mixed with 22 milligrams of Et₃Al at a temperature of 180° F. A hydrogen pressure of 150 p.s.i.g. and a total pressure of 700 p.s.i.g. was used. Ethylene was fed on demand during the one hour course of the polymerization.

A 44 milligram amount of Et₃Al in alkane and a slurry of catalyst in hexane were mixed in a syringe for a short period and then placed into the autoclave.

The results are shown in the Table below.

| Catalyst | Catalyst amount (milli- grams) | Yield (grams polymer/ gram of solid catalyst) |
|---|---|---|
| XVIIa | 4.7 | 5,600 |
| XVIIb | 4.0 | 12,500 |
| XVIIc | 2.8 | 12,000 |
| XVIII | 3.0 | 6,700 |

EXAMPLE XXI

The following particle form polymerizations were carried out in a 1 liter stirred autoclave using 660 milliliters of hexane mixed with 44 milligrams of Et₃Al at a temperature of 180° F. A hydrogen pressure of 150 p.s.i.g. and a total pressure of 700 p.s.i.g. of ethylene was fed on demand during the one hour course of the polymerization.

A 22 milligram amount of Et$_3$Al in alkane and a slurry of catalyst in hexane were mixed and charged to the catalyst addition assembly and then pressured into the autoclave.

The results are shown in the Table below.

| Catalyst | Catalyst amount (milligrams) | Yield (grams polymer/ gram of solid catalyst) |
|---|---|---|
| XVIIc | 2.8 | 17,500 |
| XIX* | 5 | 5,500 |
| XVIIb* | 4 | 16,700 |

*Values are approximate.

EXAMPLE XXII

A polymerization using the catalyst slurry of Example XVIIc was made under solution conditions at 325° F., 50 p.s.i.g. of hydrogen and 1,000 p.s.i.g. total pressure with ethylene fed on demand. In this way, 11 milligrams of the catalyst of Example XVIIc, slurried in hexane, was pretreated with 22 milligrams of Et$_3$Al in hexane and charged to the reactor which contained Isopar solvent treated with 44 milligrams of Et$_3$Al. After 60 minutes the reactor was vented and the polymer decanted, washed and dried.

The yield was 6,700 grams polyethylene per gram of solid catalyst.

EXAMPLE XXIII

A sample of the catalyst slurry of Example XVIIc was polymerized from the gas phase as follows: A 1 liter stainless steel autoclave was evacuated and heated overnight at 300° F. after which the reactor was cooled to 220° F. and 660 milliliters of purified hexane containing 44 milligrams of triethyl aluminum was charged to the reactor with 400 p.s.i.g. of ethylene. The system was stirred one hour, partially vented to 300 p.s.i.g., and hydrogen added to raise the total pressure to 450 p.s.i.g. After 25 minutes additional stirring at 180° F., a 0.8 milliliter portion of catalyst slurried in hexane (2.8 milligrams of solid catalyst) mixed with 1 milliliter of triethylaluminum in alkane (22 milligrams of triethylaluminum) was charged to the catalyst addition assembly and pressured into the reactor with ethylene and 30 milliliters of purified hexane. The ethylene pressure was increased to 700 p.s.i.g. and fed on demand during the one hour polymerization at 180° F. After venting the reactor and separating and drying the polymer, a yield of 17,500 grams polyethylene per gram of solid catalyst was found.

What is claimed is:

1. A process for forming a supported polymerization catalyst which consists essentially of:
   (a) reacting in a liquid medium between about 10° C. and about 50° C. a first component which is magnesium hydroxide or magnesium hydroxide-alkoxide with a second component which is aluminum chloride in the presence of a dialkyl ether wherein the alkyl group contains from one (1) to about six (6) carbon atoms; and
   (b) combining the product of step (a) at about 10° C. to about 50° C. with a higher-valent titanium or vanadium compound which is an alkoxide, chloroalkoxide, bromoalkoxide, chloride or bromide and removing the uncombined higher-valent titanium or vanadium compound.

2. The process of claim 1 wherein said first component is magnesium hydroxide.

3. The process of claim 1 wherein said higher-valent titanium or vanadium compound is titanium or vanadium tetrachloride.

4. The process of claim 1 wherein said dialkyl ether is diethyl ether.

5. The process of claim 1 wherein said first component is magnesium hydroxide, said higher-valent titanium or vanadium compound is titanium or vanadium tetrachloride and said dialkyl ether is diethyl ether.

6. A process for polymerizing ethylene, a C$_3$ to C$_8$ alpha-olefin, butadiene or mixture of ethylene with up to about ten (10) weight percent of either a C$_3$ to C$_8$ alpha-olefin or butadiene which comprises contacting said ethylene, C$_3$ to C$_8$ alpha-olefin, butadiene or mixture of ethylene with up to about ten (10) weight percent of either a C$_3$ to C$_8$ alpha-olefin or butadiene with an alkyl promoted supported catalyst, said catalyst made by a process which consists essentially of:
   (a) reacting in a liquid medium between about 10° C. and about 50° C. a first component which is magnesium hydroxide or magnesium hydroxide-alkoxide with a second component which is aluminum chloride in the presence of a dialkyl ether wherein the alkyl group contains from one (1) to about six (6) carbon atoms; and
   (b) combining the product of step (a) at about 10° C. to about 50° C. with a higher-valent titanium or vanadium compound which is an alkoxide, chloroalkoxide, bromoalkoxide, chloride or bromide and removing the uncombined higher-valent titanium or vanadium compound; and
   (c) combining the result of step (b) with trialkylaluminum compound.

7. The process of claim 6 wherein said first component is magnesium hydroxide.

8. The process of claim 6 wherein said higher-valent titanium or vanadium compound is titanium or vanadium tetrachloride.

9. The process of claim 6 wherein said dialkyl ether is diethyl ether.

10. The process of claim 6 wherein said first component is magnesium hydroxide, said higher-valent titanium or vanadium compound is titanium or vanadium tetrachloride and said dialkyl ether is diethyl ether.

11. The process of claim 6 wherein ethylene is polymerized.

12. The process of claim 7 wherein ethylene is polymerized.

13. The process of claim 8 wherein ethylene is polymerized.

14. The process of claim 9 wherein ethylene is polymerized.

15. The process of claim 10 wherein ethylene is polymerized.

References Cited

UNITED STATES PATENTS

| 3,644,318 | 2/1972 | Diedrich et al. | 260—94.9 DA |
| 3,676,415 | 7/1972 | Diedrich et al. | 260—94.9 DA |

FOREIGN PATENTS

| 1,255,575 | 12/1971 | Great Britain. |
| 2,035,943 | 2/1971 | Germany. |

JOSEPH L. SCHOFER, Primary Examiner

E. J. SMITH, Assistant Examiner

U.S. Cl. X.R.

252—429 B, 429 C; 260—88.2 R, 93.7, 94.3, 94.9 C

UNITED STATES PATENT OFFICE
CERTIFICATE OF CORRECTION

Patent No. 3,819,599    Dated June 25, 1974

Inventor(s) Peter Fotis and David E. Boone

It is certified that error appears in the above-identified patent and that said Letters Patent are hereby corrected as shown below:

Col. 4, Line 27    "VI" should be IV
Col. 5, Line 13    "108°" should be 108°C.
Col. 6, Line 50-53  Heading "EXAMPLE II" should precede Line 50
Col. 8, Line 6     omit "," after excess
Col. 8, Line 34    "Twenty five" should be Twenty-five
Col. 9, Line 3 of footnote to table in Example XVI, "torr" should be torr.

Signed and sealed this 22nd day of October 1974.

(SEAL)
Attest:

McCOY M. GIBSON JR.
Attesting Officer

C. MARSHALL DANN
Commissioner of Patents